(12) United States Patent
Janeczek

(10) Patent No.: US 7,713,055 B2
(45) Date of Patent: May 11, 2010

(54) BLOW MOLD ASSEMBLY

(75) Inventor: James D. Janeczek, Tecumseh, MI (US)

(73) Assignee: Milacron LLC, Batavia, OH (US)

( * ) Notice: Subject to any disclaimer, the term of this patent is extended or adjusted under 35 U.S.C. 154(b) by 1240 days.

(21) Appl. No.: 11/253,111

(22) Filed: Oct. 18, 2005

(65) Prior Publication Data

US 2007/0087075 A1    Apr. 19, 2007

(51) Int. Cl.
B29C 49/48    (2006.01)
(52) U.S. Cl. ..................................... 425/525
(58) Field of Classification Search ............ 425/525, 425/527, 531; 215/42, 44
See application file for complete search history.

(56) References Cited

U.S. PATENT DOCUMENTS

| | | | | |
|---|---|---|---|---|
| 2,124,638 A | * | 7/1938 | Sheldon et al. | 215/252 |
| 3,158,278 A | * | 11/1964 | Knapp et al. | 215/252 |
| 3,484,012 A | * | 12/1969 | White et al. | 215/252 |
| 3,784,040 A | * | 1/1974 | Douglas | 215/42 |
| 3,869,237 A | * | 3/1975 | Hellmer et al. | 425/527 |
| 3,904,061 A | | 9/1975 | Keeler | |
| 4,451,426 A | * | 5/1984 | Branchadell | 264/535 |
| 5,027,964 A | * | 7/1991 | Banich, Sr. | 215/252 |
| 5,776,518 A | * | 7/1998 | Wohlgemuth | 425/182 |
| 5,964,362 A | * | 10/1999 | Sandor et al. | 215/43 |
| 6,105,800 A | | 8/2000 | Czesak | |
| 6,471,909 B1 | * | 10/2002 | Czesak | 264/540 |
| 6,523,710 B1 | | 2/2003 | Hidding et al. | |
| 6,527,133 B1 | | 3/2003 | McCollum et al. | |
| 6,554,146 B1 | | 4/2003 | DeGroff et al. | |
| D486,739 S | | 2/2004 | Taylor et al. | |
| D494,068 S | | 8/2004 | Taylor et al. | |
| 2004/0069736 A1 | * | 4/2004 | Peronek et al. | 215/42 |
| 2004/0140284 A1 | * | 7/2004 | Taylor et al. | 215/42 |
| 2007/0181525 A1 | * | 8/2007 | Gregory et al. | 215/252 |

* cited by examiner

*Primary Examiner*—Robert B Davis
(74) *Attorney, Agent, or Firm*—John W. Gregg

(57) ABSTRACT

A blow molded container comprises a transfer ring open to the container body and characterized by a plurality of arcuate recesses in the sidewall thereof disposed to reduce deformation at the junction of the top transfer ring surface and container neck resulting from compressive forces acting on the neck along the longitudinal axis of the container. Advantageously an elongated dome protrudes outwardly from each sidewall recess, each dome being open to the interior of the container. A blow mold assembly for extrusion blow molding of a container according to the invention comprises first and second mating mold components, each mating mold component comprising molding surfaces open to a mating face of the mold component. Advantageously each mating mold component comprises a removable insert comprising the molding surfaces defining the neck and transfer ring of the container.

9 Claims, 3 Drawing Sheets

BLOW MOLD ASSEMBLY

BACKGROUND OF THE INVENTION

1. Field of the Invention

This invention relates generally to blow molded containers. In particular, this invention relates to such of those containers wherein the so called bumper roll or transfer ring is formed in the blow molding process and mold assemblies for such containers.

2. Description of Related Art

Blow molding is a cyclic process wherein a hollow tubular preform of material in a moldable condition is centered on the parting plane of a mold assembly, the mold assembly is closed around the preform, the preform is expanded so the exterior of the preform abuts molding surfaces defined by the closed mold assembly, the blow molded article is conditioned to be sufficiently rigid to retain its size and shape while unsupported, the mold assembly is opened and the blow molded article is removed. In general, the moldable condition of the preform is achieved when the material of the preform is at an elevated temperature, and the rigid condition of the blow molded article is achieved when the temperature of the material has been reduced. A blow molding machine comprises a press for opening and closing the mold assembly and blowing means for introducing a pressurized fluid (typically air) to expand the preform in the mold assembly. One type of blow molding equipment produces blow molded containers from tubular extrusions produced by extruding equipment arranged relative a molding assembly to position one or more extrusions in the parting plane of the mold assembly. Additionally, blow molding machines may comprise means for handling the molded article upon removal from the mold assembly and means for trimming waste from the molded article (single-stage machines only). Hence, it is known to produce containers having features for facilitating manipulation thereof for removal from mold assemblies and conveyance for subsequent operations.

Blow molding is commonly used for production of containers for transporting, storing and dispensing liquids wherein the blow molded article comprises a body portion comprising a closed end and a neck connecting the container body with a mouth opening for filling the container and dispensing the contents therefrom. Advantageously, the neck portion of the container comprises an exterior surface having a feature, such as a thread, referred to herein as the "neck finish", for engaging a separable closure for covering the mouth. In addition, the neck portion further comprises an element referred to herein as a "transfer ring" or "bumper roll" for facilitating manipulation of the blow molded article. Mold assemblies for blow molding containers comprise mating mold components wherein molding surfaces open to the mating faces of the mold components define the exterior of the container. Advantageously, mold assemblies comprise replaceable inserts for forming the neck portion, the inserts defining the exterior surface of both the neck finish and the transfer ring. Replacement of such inserts permits production of containers having a different neck finish or to refurbish inserts that are degraded through use.

To broaden the range of containers for which a particular grasping device is suitable, it is desirable to provide transfer rings of large diameter relative to the container body. To insure complete conformance of the preform with the molding surfaces defining the outside diameter of such transfer rings, the height of the transfer rings must be relatively large. Consequently, there is an increased potential for unacceptable deformation at the junction of the transfer ring and neck portion when the container is subjected to compressive loads, as may occur in stacking of filled containers.

SUMMARY OF THE INVENTION

It is an object of the present invention to provide a blow molded container comprising a transfer ring open to the container body and characterized by a plurality of arcuate recesses in the sidewall thereof disposed to reduce deformation at the junction of the top transfer ring surface and container neck resulting from compressive forces acting on the neck along the longitudinal axis of the container.

It is a further object of the present invention to provide a mold assembly for extrusion blow molding of a container comprising a transfer ring open to the container body and characterized by a plurality of arcuate recesses in the sidewall thereof disposed to reduce deformation at the junction of the top ring surface and container neck resulting from compressive forces acting on the neck along the longitudinal axis of the container.

Further objects and advantages of the invention shall be made apparent from the accompanying drawings and the following description thereof.

In accordance with the aforesaid objects the present invention provides a blow molded container comprising a container body, a neck including a mouth opening and having surface features for engaging a separable closure for covering the mouth, a base for supporting the container body in an upright position, and a transfer ring interposed between the neck and container body, the transfer ring being open to the container body and comprising a top ring surface joined to the neck, a bottom ring surface joined to the container body and a sidewall defining the outer perimeter of the transfer ring and being joined to the top ring surface and the bottom ring surface, the transfer ring projecting outside the periphery of the container body at the junction of the bottom ring surface and container body and characterized by a plurality of arcuate recesses in the sidewall disposed to reduce deformation at the junction of the top ring surface and neck resulting from compressive forces acting on the neck along the longitudinal axis of the container. Advantageously, an elongated dome protrudes outwardly from each sidewall recess, each dome being open to the interior of the container. A blow mold assembly for blow molding at least one container in accordance with the invention from a tubular extrusion comprises first and second mating mold components, each mating mold component comprising molding surfaces open to a mating face of the mold component and defining the exterior of an article to be molded, the molding surfaces comprising first molding surfaces defining the container body, second molding surfaces defining the neck of the container and third molding surfaces defining the base of the container. Advantageously each mating mold component comprises a removable insert comprising the second molding surfaces.

DETAILED DESCRIPTION OF THE PREFERRED EMBODIMENT

The invention shall be illustrated with reference to a preferred embodiment which shall be described in detail. It is not the intention of applicant that the invention be limited to the preferred embodiment, but rather that the invention shall be defined by the appended claims and all equivalents thereof.

Figure 1:
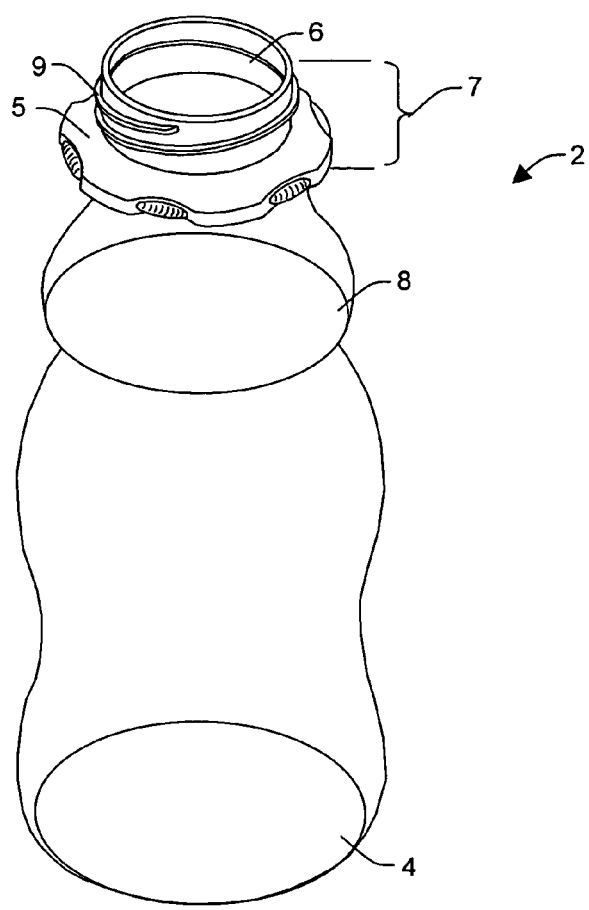
FIG. 1 illustrates a container with a transfer ring in accordance with the invention.

Referring to FIG. 1, container 2 comprises a closed end at base 4 and a mouth opening 6 joined to hollow body 8 by neck 7. Neck 7 comprises neck finish 9 shown as a thread flight for engaging a closure (not shown) for covering mouth opening 6. Base 4 is advantageously concave so that container 2 is supported in an upright position when rested on base 4. As shown in FIG. 1, transfer ring 5 is interposed between neck finish 9 and body 8 and is of relatively large diameter compared to body 8. The relatively large diameter of transfer ring 5 increases the tolerance for engaging means used to grasp container 2 for removal from a blow mold assembly.

Figure 2:
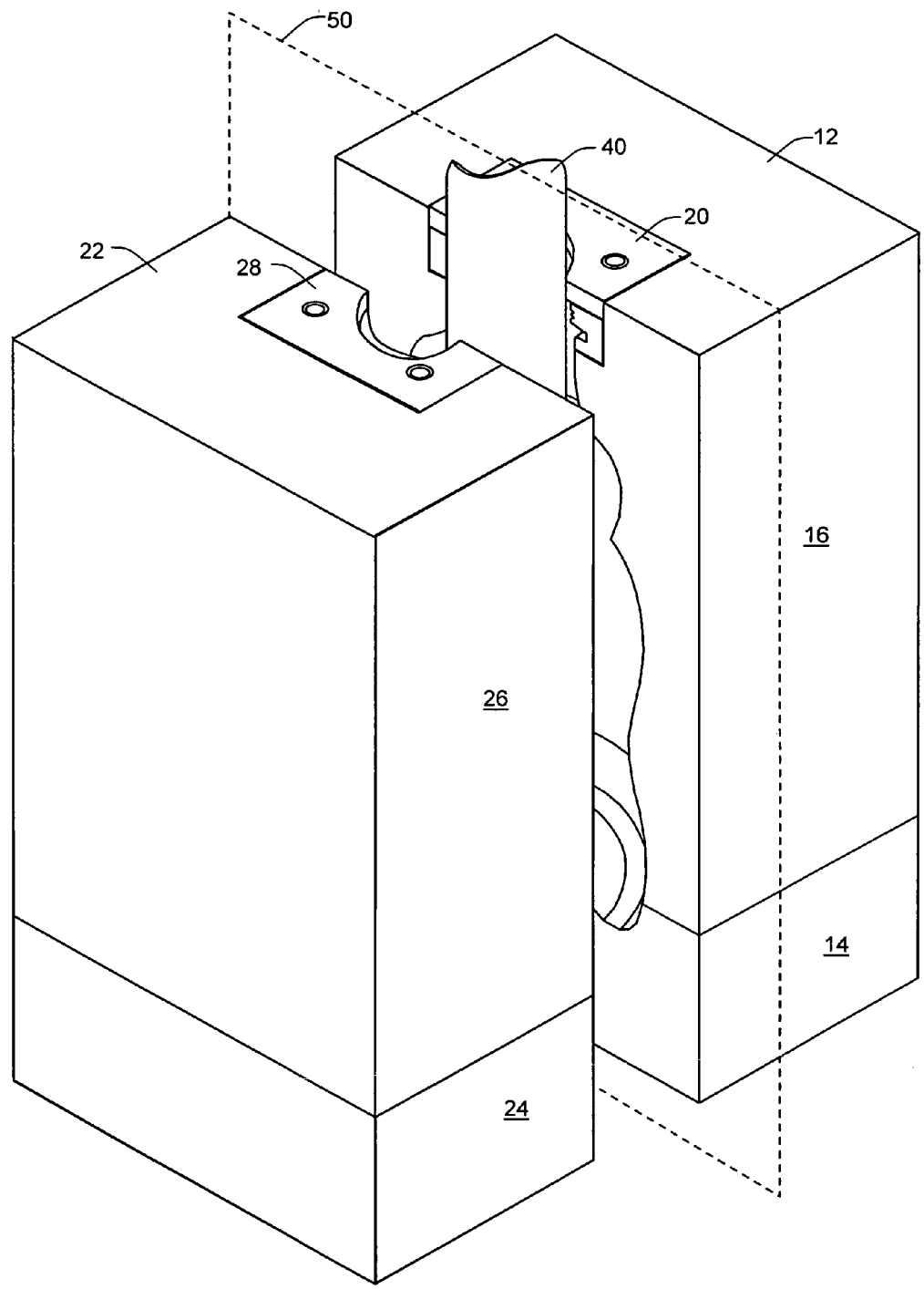
FIG. 2 illustrates a mold assembly for blow molding the container of FIG. 1.

Referring to FIG. 2, mold assembly 10 comprises mating mold components 12 and 22 each referred to herein as a "mold half". Each of mold components 12 and 22 is carried by a member of a molding machine press (not shown) for translating the mold components between open and closed positions relative to each other (the open position depicted in FIG. 2). In the open position, mold components 12 and 22 are separated permitting admission of a preform such as preform 40 therebetween and removal of a molded article upon completion of a molding operation. In the closed position, mold components 12 and 22 abut at parting plane 50, the abutting faces of mold components 12 and 22 having molding surfaces thereon defining a cavity. Preform 40 is tubular, typically produced by extrusion of flowable material through a die (not shown) above mold assembly 10. Preform 40 is formed as a single continuous tubular extrusion below the lowest molding surface of the cavity. With the molds closed surrounding the preform, the preform is pinched closed at the closed end of the cavity and pressurized through the open end of the preform to expand the preform material to abut the molding surfaces of the cavity.

Figure 3A:
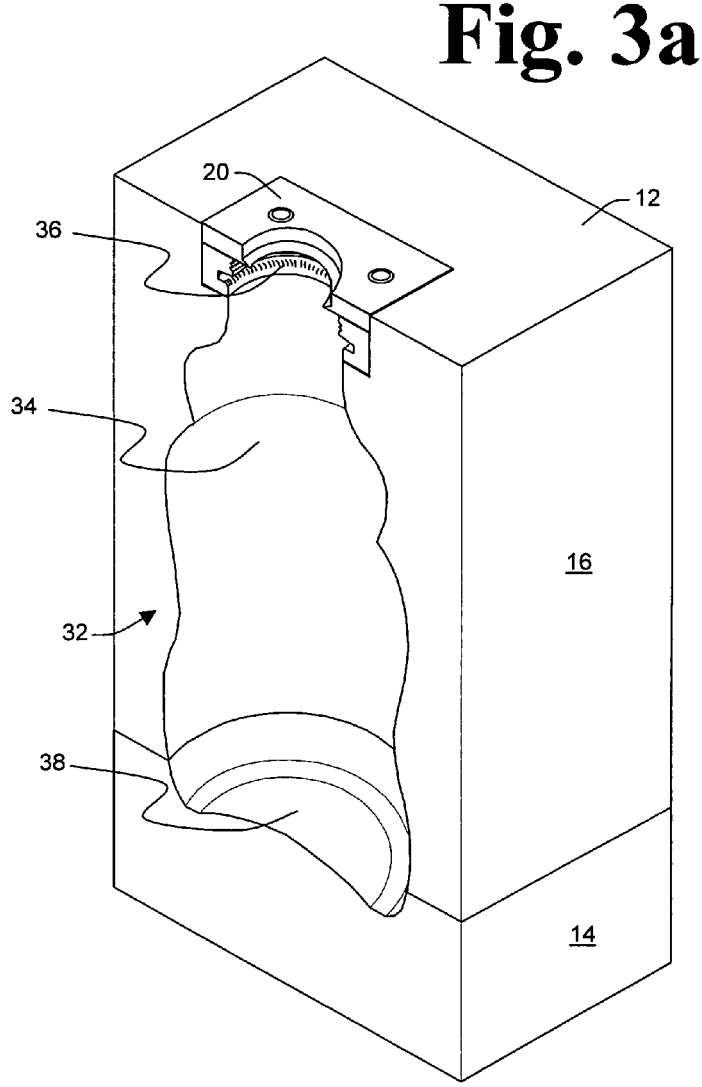
FIGS. 3a and 3b illustrates mold components of the mold assembly of FIG. 2

Referring to FIG. 3a, a portion 32 of the cavity defined by mold component 12 comprises molding surfaces 34, 36 and 38. Molding surfaces 34 define the body 8 of the container of FIG. 1; molding surfaces 36 define the neck 7 of the container of FIG. 1 and, molding surfaces 38 define the base portion 4 of the container of FIG. 1. Mold component 12 comprises center section 16 comprising molding surfaces 34; end section 14 comprising molding surfaces 38 and, insert 20 comprising molding surfaces 36. The corresponding sections of mold component 22 are center section 26, end section 24 and insert 28. Each of sections 22-28 comprise molding surfaces substantially mirroring molding surfaces 34, 36 and 38, respectively.

Figure 3B:
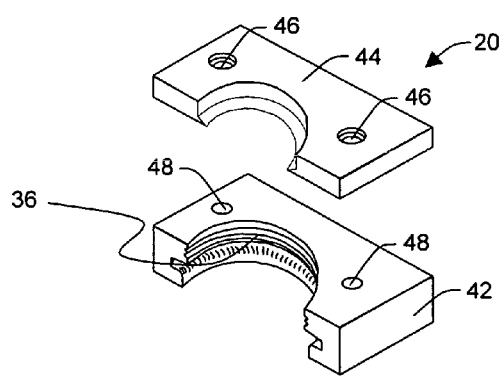

Referring to FIG. 3b, insert 20 is shown removed from mold component 12 and with knife 44 separated from finish insert 42. Insert 20 is attached to mold component 12 by retaining means such as threaded fasteners (not shown) received in bores 46 of knife 44 and passing through bores 48 of finish insert 42 into center section 16 of mold component 12. A parting groove is formed in the periphery of the preform at the mouth of the container by a relatively sharp edge of knife 44. The parting groove facilitates separation of the blow molded container from extrusion 40 on completion of blow molding. Molding surfaces 36 of finish insert 44 define transfer ring 5.

Figure 4:
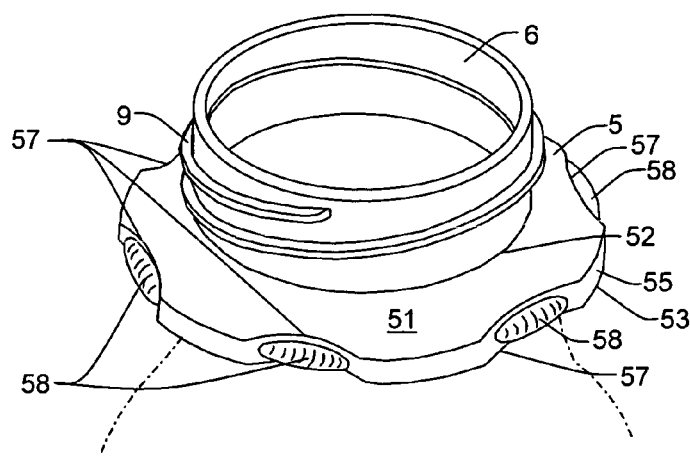
FIG. 4 is an enlarged view of the neck of the container of FIG. 1.
Figure 5:
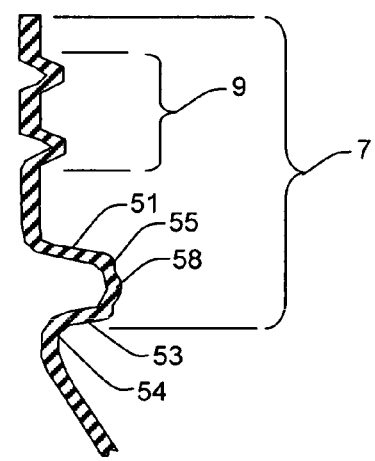
FIG. 5 is a cross section of a portion of the neck of the container of FIG. 1.

Referring to FIGS. 4 and 5 transfer ring 5 comprises top ring surface 51 joined to neck 7 at circular junction 52, bottom ring surface 53 joined to hollow body 8 by arcuate fillet 54 and sidewall 55 defining the outer perimeter of transfer ring 5 and joining top ring surface 51 and bottom ring surface 53. Sidewall 55 comprises recesses ("scallops") 57 arcuate in the planes of top ring surface 51 and bottom ring surface 53 and disposed to reduce deformation of the container material at circular junction 52 resulting from compressive loads applied to neck 7 in the direction of the longitudinal axis of container 2. Such loads apply a bending moment to top ring surface 51 relative to the junction of top ring surface 51 and sidewall 55 and a bending moment to sidewall 55 relative to the junction of sidewall 55 with bottom ring surface 53. Arcuate recesses 57 improve resistance of bending of both top ring surface 51 and sidewall 55 to these bending moments, the magnitude and effect of the bending moments varying inversely with proximity of the sidewall 55 to circular junction 52. Hence, where scallops 57 are closest to circular junction 52, the bending moments acting on top ring surface 51 relative to the junction with sidewall 55 and on sidewall 55 relative to the junction with bottom ring surface 53 are minimized.

Continuing with reference to FIGS. 4 and 5, advantageously, a protruding elongated dome 58 is disposed within each scallop. As shown in FIG. 4, the protrusion of each dome is arcuate and the junction of each dome 58 with recess 57 is arcuate in the plane of recess 57 and transverse to the plane of recess 57 whereby each dome 58 narrows toward the ends of recess 57. The protruding domes interpose junctions between the top of sidewall 55 and the junction of sidewall 55 with bottom ring surface 53, dissipating the effect of bending moments of sidewall 55 relative to the junction with bottom ring surface 53 within each scallop. Hence domes 58 increase resistance to bending of sidewall 55 toward neck 7 along the span of each dome 58. The resistance to bending of top ring surface 51 relative to the junction with sidewall 55 and of sidewall 55 relative to the junction with bottom ring surface 53 increases the resistance to creasing or buckling of the container material at circular junction 52 when neck 7 is subjected to compressive loads. The reduced bending of top ring surface 51 and sidewall 55 limits reduction of the included angle between neck 7 and top ring surface 51 at circular junction 52, hence reducing formation of creases and buckling at circular junction 52.

What is claimed is:

1. A mold assembly for blow molding at least one container from a tubular extrusion, the container characterized by: (i) a container body; (ii) a base for supporting the container body in an upright position; and (iii) a neck including a mouth opening and having surface features for engaging a separable closure for covering the mouth and a transfer ring open to the interior of the container body and comprising a top ring surface joined to the neck, a bottom ring surface joined to the container body and a sidewall defining the outer perimeter of the transfer ring and being joined to the top ring surface and the bottom ring surface, the transfer ring projecting outside the periphery of the container body at the junction of the bottom ring surface and container body and characterized by a plurality of arcuate recesses in the sidewall disposed to reduce deformation at the junction of the top ring surface and neck resulting from compressive forces acting on the neck along the longitudinal axis of the container, the mold assembly comprising first and second mating mold components, each mating mold component comprising molding surfaces open to a mating face of the mold component and defining the exterior of an article to be molded, the molding surfaces comprising first molding surfaces defining the container body, second molding surfaces defining the neck of the container and third molding surfaces defining the base of the container.

2. The mold assembly according to claim 1 wherein each mating mold component further comprises a removable insert comprising the second molding surfaces.

3. The mold assembly according to claim 2 wherein the removable insert comprises a knife for forming a parting groove at the mouth opening of the container molded into the tubular extrusion.

4. A mold assembly for blow molding at least one container from a tubular extrusion, the container characterized by: (i) a container body; (ii) a base for supporting the container body in an upright position; and (iii) a neck including a mouth opening and having surface features for engaging a separable closure for covering the mouth and a transfer ring open to the container body and comprising a top ring surface joined to the neck, a bottom ring surface joined to the container body and a sidewall defining the outer perimeter of the transfer ring and being joined to the top ring surface and the bottom ring surface, the transfer ring projecting outside the periphery of the container body at the junction of the bottom ring surface and container body and characterized by a plurality of arcuate recesses in the sidewall disposed to reduce deformation at the junction of the top ring surface and neck resulting from compressive forces acting on the neck along the longitudinal axis of the container and an elongated dome protruding outwardly from each sidewall recess, each dome being open to the interior of the container, the mold assembly comprising first and second mating mold components, each mating mold component comprising molding surfaces open to a mating face of the mold component and defining the exterior of an article to be molded, the molding surfaces comprising first molding surfaces defining the container body, second molding surfaces defining the neck of the container and third molding surfaces defining the base of the container.

5. The mold assembly according to claim 4 wherein each mating mold component further comprises a removable insert comprising the second molding surfaces.

6. The mold assembly according to claim 5 wherein the removable insert comprises a knife for forming a parting groove at the mouth opening of the container molded into the tubular extrusion.

7. A mold assembly for blow molding at least one container from a tubular extrusion, the container characterized by: (i) a container body; (ii) a base for supporting the container body in an upright position; and (iii) a neck including a mouth opening and having surface features for engaging a separable closure for covering the mouth and a transfer ring open to the container body and comprising a top ring surface joined to the neck, a bottom ring surface joined to the container body and a sidewall defining the outer perimeter of the transfer ring and being joined to the top ring surface and the bottom ring surface, the transfer ring projecting outside the periphery of the container body at the junction of the bottom ring surface and container body and characterized by a plurality of arcuate recesses in the sidewall disposed to reduce deformation at the junction of the top ring surface and neck resulting from compressive forces acting on the neck along the longitudinal axis of the container and an elongated dome protruding outwardly from each sidewall recess, each dome being open to the interior of the container and wherein the protrusion of each dome is arcuate and wherein the junction of each dome with the recess is arcuate in the plane of the recess and arcuate transverse to the plane of the recess whereby the dome narrows near the ends of the recess, the mold assembly comprising first and second mating mold components, each mating mold component comprising molding surfaces open to a mating face of the mold component and defining the exterior of an article to be molded, the molding surfaces comprising first molding surfaces defining the container body, second molding surfaces defining the neck of the container and third molding surfaces defining the base of the container.

8. The mold assembly according to claim 7 wherein each mating mold component further comprises a removable insert comprising the second molding surfaces.

9. The mold assembly according to claim 8 wherein the removable insert comprises a knife for forming a parting groove at the mouth opening of the container molded into the tubular extrusion.

\* \* \* \* \*